United States Patent [19]

Neff

[11] Patent Number: 4,880,033

[45] Date of Patent: Nov. 14, 1989

[54] POPPET VALVE

[75] Inventor: James A. Neff, Birmingham, Mich.

[73] Assignee: MAC Valves, Inc., Wixom, Mich.

[21] Appl. No.: 282,752

[22] Filed: Dec. 12, 1988

[51] Int. Cl.⁴ .......................................... F15B 13/044
[52] U.S. Cl. ........................ 137/625.65; 137/625.27; 137/625.5
[58] Field of Search ............ 137/625.27, 625.5, 625.65

[56] References Cited

U.S. PATENT DOCUMENTS

| | | | |
|---|---|---|---|
| 3,202,182 | 8/1965 | Haviland | 137/625.27 |
| 3,510,103 | 5/1970 | Carsello | 251/333 |
| 3,538,954 | 10/1970 | Fagerlie et al. | 137/625.65 |
| 3,884,266 | 5/1975 | Kondo | 137/625.27 |
| 4,100,519 | 7/1978 | Neff | 137/625.65 X |
| 4,271,868 | 6/1981 | Neff | 137/625.64 |
| 4,298,027 | 11/1981 | Neff | 137/625.65 |
| 4,407,323 | 10/1983 | Neff | 137/625.65 X |
| 4,453,697 | 6/1984 | Neff | 251/14 |
| 4,574,844 | 3/1986 | Neff et al. | 137/625.65 |

Primary Examiner—Gerald A. Michalsky
Attorney, Agent, or Firm—Robert G. Mentag

[57] ABSTRACT

A three-way normally closed, pilot air valve for supplying pressurized pilot air to a directional flow control air valve. The valve includes a valve body structure having a pilot air inlet port, a cylinder port, an exhaust port, an axial bore therethrough. A first passageway connects the pressurized pilot air inlet port to the cylinder port. A second passageway connects the cylinder port with the exhaust port. A balanced captive poppet valve spool is movably mounted in the valve body structure axial bore for controlling the flow of air through the two passageways, and it has an upper and a lower, conical annular, valve member element, which alternately seat on a circular sharp edged valve seat and an angled valve seat, respectively.

2 Claims, 1 Drawing Sheet

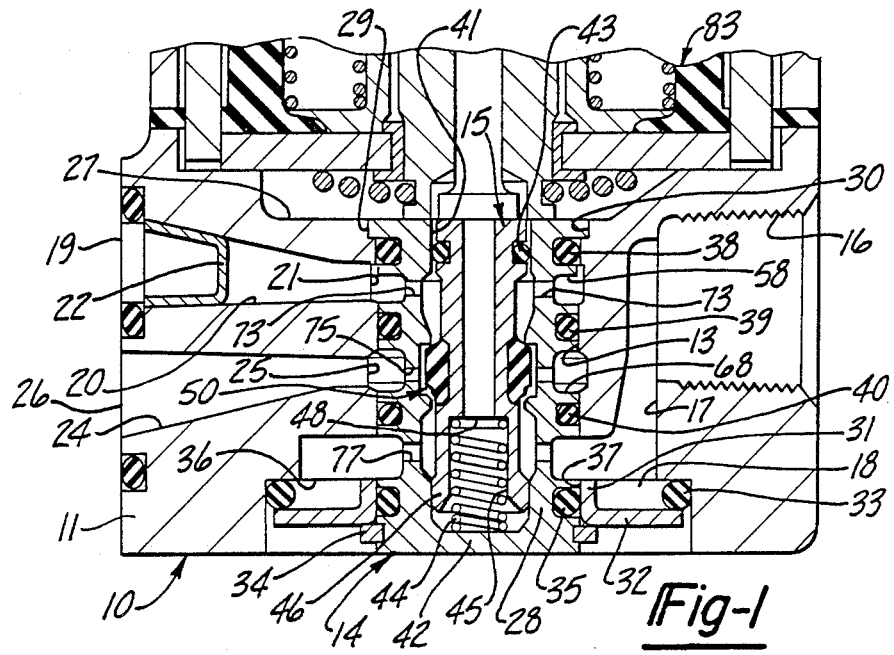
Fig-1
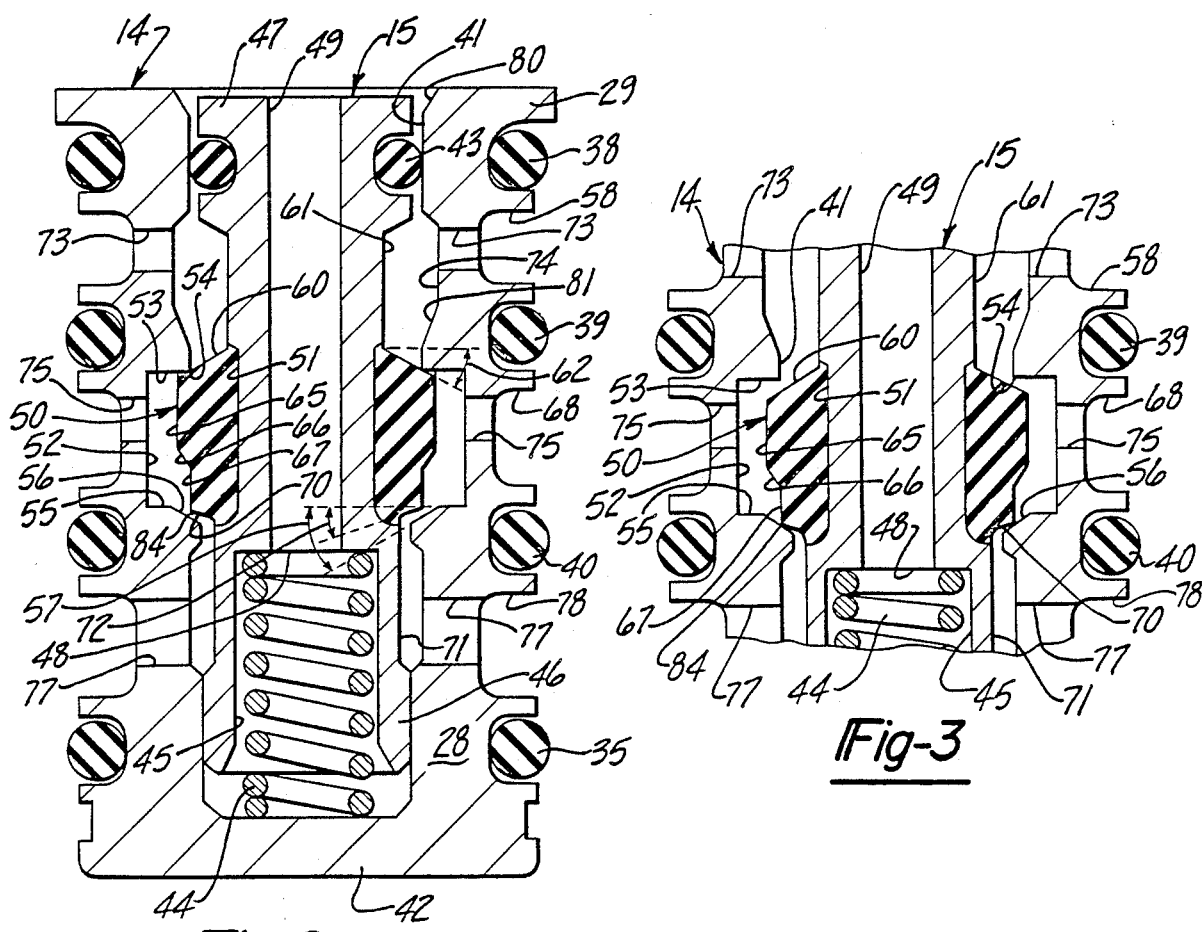
Fig-2
Fig-3

POPPET VALVE

BACKGROUND OF THE INVENTION

1. Technical Field

The field of art to which the invention pertains may be generally located in the class of devices relating to valves. Class 137, Fluid Handling, U.S. Patent Office Classification, appears to be the applicable general area of art to which the subject matter similar to this invention has been classified in the past.

2. Background Information

This invention relates generally to air valves, and more particularly, to a three-way, normally closed, pilot air valve for use in controlling the flow of pilot air to a directional flow control valve for operating the main spool valve thereof. The type of directional flow control valve which may be controlled by the pilot air valve of the present invention includes four-way valves, three-way valves, two-way valves, and the like. A three-way normally closed, pilot air valve includes a captive poppet valve spool which is movably mounted in a valve bore formed directly in a valve body, or in a valve retainer member mounted in the valve body, and which is movable between a closed position and an open position. The captive poppet valve spool has an upper conical annular, poppet valve member element adapted to be seated on a first sharp edged circular valve seat when the poppet captive valve spool is in the inoperative or closed position, and a lower conical annular, poppet valve member element adapted to be seated on a second sharp edged circular valve seat when the captive poppet valve spool is in the operative or open position. Examples of prior art pilot air valves are shown in U.S. Pat. Nos. 4,100,519, 4,271,868, 4,298,027 and 4,407,323.

A problem encountered with the use of a captive poppet valve spool in a pilot air valve of the aforementioned type, is that the captive poppet valve spool is moved from an inoperative or closed position to an operative or open position by an electrical solenoid which shifts the captive poppet valve spool at a high speed, and the lower conical annular, poppet valve member element on the captive poppet valve spool hits its respective sharp edged seat at a high rate of speed, whereby after a period of use the lower conical annular, poppet valve member element is cut, abraded, and parts of it are sheared off. The captive poppet valve spool is returned to the inoperative or closed position after the solenoid is de-energized by a return spring, but the return movement of the captive poppet valve spool is a slow movement compared to the movement in the opposite direction when the solenoid is energized to move the captive poppet valve spool from the inoperative or closed to the operative or open position. Attempts have been made to overcome the aforementioned problem by making the conical annular, poppet valve member elements on the captive poppet valve spool from elastomeric materials which are tough materials, and resistant to abrasion, such as urethane. However, during use, urethane reverts back to a gum stage, due to water and oil mixes or emulsions, which a valve may be subjected to during use. There is water and oil in pneumatic or air systems and these elements also cause the urethane to swell. The use of a nitrile compound which is much more resistant to oil and water than a urethane compound has been used to provide the elastomeric material for the conical annular, poppet valve member elements on a captive poppet valve spool of this type. However, a nitrile compound is not as tough and abrasion resistant as urethane.

SUMMARY OF THE INVENTION

The invention relates to a solenoid operated, pilot air valve which includes a captive poppet valve spool which is provided with a pair of conical annular, poppet valve member elements and wherein an upper one of said conical annular, poppet valve member elements is seated on a circular sharp edged poppet valve seat when the poppet valve spool is in an inoperative or closed position, and a lower one of said pair of conical annular, poppet valve member elements is adapted to be seated on a circular acute angled poppet valve seat when the poppet valve spool is in an open position. The angles of the conical annular, poppet valve member elements on the poppet valve spool are formed in an acute angle relative to a transverse plane through the poppet valve spool, with the acute angle on the upper conical annular, poppet valve member element which is adapted to seat on the circular sharp edged poppet valve seat being of a larger acute angle than the acute angle on the lower conical annular, poppet valve member element.

It is an object of the present invention to provide a novel, three-way, normally closed, pilot air valve which overcomes the problem of the deterioration and destruction of the conical annular, poppet valve member elements on a three-way valve captive poppet air valve spool due to the speed of operation of a solenoid operating the valve.

It is another object of the present invention, to provide a solenoid operated three-way, normally closed, pilot air valve with a novel and improved captive poppet air valve spool and mating valve seat structure, which provides a longer life valve due to an improved longer life poppet valve seal means.

BRIEF DESCRIPTION OF THE DRAWING

FIG. 1 is a fragmentary, elevation section view of a three-way, normally closed, pilot air valve made in accordance with the principles of the present invention.

FIG. 2 is an enlarged, elevation section view of the captive poppet valve spool and poppet valve spool retainer illustrated in FIG. 1, and showing the captive poppet valve spool in an inoperative or closed position.

FIG. 3 is a fragmentary, elevation section view of the captive poppet valve spool shown in FIG. 2, and showing the captive poppet valve spool shifted downwardly to an operative or open position.

DESCRIPTION OF THE PREFERRED EMBODIMENT

Referring now to the drawing, and in particular to FIG. 1, the numeral 10 generally designates a three-way, normally closed pilot air valve, made in accordance with the principles of the present invention. The pilot air valve 10 includes a valve body 11 which is adapted to be operatively mounted on a fluid flow control valve to be controlled by the pilot air valve 10, as for example a four-way valve, a three-way valve, a two-way valve, and the like.

As shown in FIG. 1, the pilot air valve 10 is provided with an axial bore 13 which is formed through the valve body 11. A tubular valve retainer member, generally indicated by the numeral 14, is releasably mounted in the bore 13 and it extends completely through the bore 13. As shown in FIG. 1, a captive poppet valve spool, generally indicated by the numeral 15, is movably mounted in the tubular valve retainer member 14, as more fully described hereinafter.

As shown in FIG. 1, the valve body 11 is provided with an exhaust port 16 that is connected by a passage 17 to an exhaust chamber 18, which is formed in the lower end of the valve body 11 and communicates with the lower end of the valve body bore 13.

As shown in FIG. 1, the pilot air valve 10 is provided with a pilot air inlet port 19 which would be operatively connected to a suitable source of pilot air under pressure, or connected to a passageway in the fluid flow control valve controlled by the pilot air valve 10, for the reception of mainline pressurized air from the same source that would be used to supply line pressure to said fluid flow control valve. The pilot air inlet port 19 is connected by a passage 20 to an annular groove 21, which is formed in the wall of the axial bore 13, perpendicular to the longitudinal axis of the inlet port 19. A suitable air filter 22 is operatively mounted in the pilot air inlet passage 20.

As shown in FIG. 1, a cylinder or outlet passage 24 is formed in the valve body 11, with the inner end thereof communicating with an annular groove 25 formed in the wall of the valve body axial bore 13. The outer end of the cylinder passage 24 comprises a port 26 which would be connected to the valve spool chamber of the fluid flow control valve controlled by the pilot air valve 10.

The tubular valve retainer member 14 comprises an elongated tubular body 28, which is removably mounted in the axial bore 13 in the valve body 11. The tubular body 28 of the valve retainer member 14 extends from the recessed upper end 27 of the valve body 11 down through the bore 13, and through the exhaust chamber 18, and to the bottom end of the valve body 11. The upper end of the tubular valve retainer body 28 is provided with an annular, radially extended shoulder 29 that is seated in an enlarged diameter valve body bore 30, which communicates with the upper end of the axial bore 13. The tubular valve retainer body 28 is assembled into the valve body bore 13 by slidably mounting it into the bore 13 from the upper end thereof, and moving it inward until the flange 29 seats on the shoulder formed by the junction of the large diameter bore 30 with the bore 13. The tubular valve retainer body 28 is releasably secured in the last mentioned position in the bore 13 by the following described structure.

The lower end of the tubular valve retainer body 28 is cylindrical, and it is slidably mounted through the bore 37 of a longitudinal, cylindrical flange 31. The flange 31 is integral with a transverse, annular flange 32, which is perpendicular to the longitudinal flange 31, and which extends radially outward adjacent the outer wall of the exhaust chamber 18. A suitable O-ring seal 33 is operatively mounted between the inner face of the annular transverse flange 32 and the inner end wall 36 of the exhaust chamber 18. A suitable O-ring 35 is mounted in a peripheral groove formed around the cylindrical lower end of the tubular valve retainer body 28, and it sealingly engages the bore 37 of the longitudinally extended cylindrical flange 31. The longitudinal, cylindrical flange 31, and the integral, annular flange 32, function together as a retainer member for the tubular valve retainer member 14, together with a releasable retainer ring 34 which is mounted adjacent the lower outer face of the annular flange 32. The retainer ring 34 is seated in a suitable groove formed around the periphery of the lower tubular end of the tubular valve retainer body 28. As shown in FIG. 1, the tubular valve retainer body 28 is provided with longitudinally spaced apart O-rings 38, 39 and 40, which are operatively mounted in grooves around the outer periphery of the valve retainer body 28, in longitudinal positions on opposite sides of the annular grooves 58 and 68. The tubular valve retainer body 28 is provided with an axial valve spool bore 41, in which is movably mounted the captive poppet valve spool 15. As shown in FIGS. 1 and 2, the bore 41 in the tubular valve retainer body 28 extends downwardly from the upper end thereof to the inner face of a transverse bottom end wall 42. The upper end portion of the captive poppet valve spool 15 is provided with an O-ring seal 43 which is operatively mounted in a groove formed around the outer periphery thereof, and it sealingly engages the bore 41 in the tubular valve retainer body 28.

As shown in FIGS. 1 and 2, the captive poppet valve spool 15 is normally biased to the normally closed, inoperative position by a return spring 44 which is mounted in an axial bore 45 that extends inwardly into the captive poppet valve spool bore lower end portion 46, and which terminates at an upper end wall 48. The lower end of the return spring 44 seats against the end wall 42 of the axial valve spool bore 41, and the upper end thereof seats against the inner end wall 48 of the poppet valve spool axial bore 45. The bore 45 in the lower end of the captive poppet valve spool 15 communicates with an axial vent bore 49 that extends through the remaining upper portion of the captive poppet valve spool 15.

As shown in FIGS. 1 and 2, the captive poppet valve spool 15 is provided with a longitudinal, centrally mounted, annular, molded poppet valve member, generally indicated by the numeral 50. The annular molded poppet valve member 50 is mounted in an annular groove 51 formed in the outer periphery 61 of the captive poppet valve spool 15. As shown in FIG. 2, the annular molded poppet valve member 50 is positioned on the captive poppet valve spool 15 in a substantially central, longitudinal position and it extends transversely or radially outward beyond the periphery 47 of the captive poppet valve spool 15 into an annular enlarged diameter recess 52 in the valve bore 41. The upper end of the enlarged diameter recess 52 terminates at a transverse end wall 53 which is perpendicular to the longitudinal axis of the valve. An upper, circular, sharp edged valve seat 54 is formed in the valve bore 41 at the junction point between the valve bore 41 and the upper end wall 53 of the enlarged diameter recess 52.

As shown in FIG. 2, the lower end wall 55 of the enlarged diameter recess 52 is disposed perpendicular to the longitudinal axis of the captive poppet valve spool 15 and it extends inwardly and terminates at the upper end of a circular, inwardly and downwardly angled or sloping, smooth faced lower valve seat surface 56, which may also be termed an inverted conical valve seat. The inner circular edge of the lower, inverted conical valve seat 56 terminates at the valve bore 41. The lower, inverted conical valve seat 56 slopes downwardly and inwardly at an acute angle measured from a transverse plane along the lower end wall 55 of the enlarged diameter recess 52. The numeral 57 in FIG. 2 designates the acute angle of the inwardly and downwardly angled face of the lower inverted conical valve seat 56. An optimum angle for the acute angle 57 is an approximate 30 degree angle.

As shown in FIG. 2, the molded annular poppet valve member 50 has formed on the upper end thereof an upper, conical annular, valve member element 60 which slopes downwardly and radially outward from the periphery 61 of the central portion of the valve spool 15, at an acute angle indicated by the numeral 62. An optimum angle 62 for the upper conical annular, valve member element 60 is approximately 30 degrees. The acute angle 62 is illustrated in FIG. 2 as being measured downwardly from a transverse plane at the junction point between the angled surface of the upper, conical annular, valve member element 60 with the valve spool periphery 61.

As shown in FIG. 2, the upper, conical annular, valve member element 60 terminates at the outer circular periphery 65 of the molded annular poppet valve member 50. The lower end of the periphery 65 of the molded, annular poppet valve 50 terminates at the upper end of an inwardly and downwardly sloping peripheral portion 66 which has a lower end that terminates at the upper end of a lower end cylindrical peripheral portion 67. A lower, conical annular, valve element member 70 is formed on the lower end of the molded annular poppet valve member 50. The lower, conical annular, valve member element 70 commences at the lower end of the cylindrical lower periphery 67 of the molded annular poppet valve member 50, and it angles or slopes downwardly and inwardly toward a peripheral lower portion 71 of the valve spool 15. The corner 84 between said lower cylindrical periphery 67 on the molded annular poppet valve 50 and the lower, conical annular, valve member element 70 is the initial, circular contact portion of the lower, conical annular, valve element 70 which seats on the lower inverted conical valve seat 56 when the valve spool 15 is shifted downwardly from the inoperative or closed position shown in FIG. 2 to the operative or open position shown in FIG. 3. The lower, conical annular, valve member element 70 slopes inwardly and downwardly to the periphery 71 of the valve spool 15 at an acute angle indicated by the numeral 72. An optimum angle for the acute angle 72 is a 15 degree angle.

As shown in FIGS. 1 and 2, a first passageway is formed through the valve body 11 and the tubular valve retainer 14 to connect the pressurized pilot air inlet port 19 to the cylinder port 26. The first passageway includes the passage 20 in the valve body 11, the enlarged bore portion 21 in the valve body bore 13, the annular groove 58 formed around the outer periphery of the tubular valve retainer body 28, and a plurality of radial bores 73 formed through the valve retainer body 28 to connect the annular groove 58 with an enlarged bore portion 74 formed in the valve bore 41 in the valve retainer body 28. Said first passage is normally closed at the lower end of said enlarged retainer valve bore portion 74 when the poppet valve spool 15 is in the normally inoperative or closed position, shown in FIGS. 1 and 2. When the poppet valve spool 15 is moved downwardly to move the lower, conical annular, valve member element 70 against the lower, inverted conical valve seat 56, said first passageway is open to the cylinder port 26, through the enlarged diameter recess 52 formed in the valve bore 41, a plurality of radial bores 75 formed in the valve retainer body 28, the annular groove 68 formed around the outer periphery of the valve retainer body 28, the enlarged bore 25 formed in the valve body bore 13, and the passage 24 formed in the valve body 11.

A second passageway is formed through the valve body 11 and the tubular valve retainer member 14, and it connects the cylinder port 26 with the exhaust port 16. The second passageway is normally open between the cylinder port 26 and the exhaust port 16 when the poppet valve spool 15 is in the normally inoperative or closed position, shown in FIGS. 1 and 2. The second passageway between the cylinder port 26 and the exhaust port 16 includes the passage 24 in the valve body 11, the enlarged valve body bore 25, the annular groove 68 formed around the outer periphery of the valve retainer body 28, a plurality of valve retainer radial bores 75, the enlarged diameter recess 52, the valve retainer bore 41, a plurality of radial bores 77 in the valve retainer body 28, the annular groove 78 formed around the lower end of the valve retainer body 28, the exhaust chamber 18 and the passage 17 which is connected to the exhaust port 16. The second passageway is closed when the poppet valve spool 15 is moved downwardly to engage the lower, conical annular, valve member element 70 with the lower, inverted conical valve seat 56.

The poppet valve spool 15 is forced into the one piece tubular valve retainer member 14, from the upper end thereof, and it cannot be removed without destroying the poppet valve spool 15. The angle of the lower, conical annular, valve member element 70 coacts with the chamber 80 at the entrance end of the valve retainer bore 41, and the angled surface 81 at the lower end of the enlarged valve retainer bore portion 74 permits the poppet valve spool 15 to be easily forced into the bore 41 of the tubular valve retainer body 28.

In use, the valve 10 is operatively mounted to a directional flow control air valve which is to be pilot air operated by the valve 10. A suitable solenoid operator 83 for the poppet valve spool 15 is operatively mounted on the upper end of the valve body 11, as viewed in fragment in FIG. 1. A suitable solenoid operator for the poppet valve spool 15 may be any conventional solenoid, as for example the solenoid illustrated in either one of U.S. Pat. Nos. 4,100,519 and 4,298,027. It will be seen that when the solenoid 83 is energized the poppet valve spool 15 is driven downwardly from the inoperative or closed position shown in FIG. 2 to the operative or open position, shown in FIG. 3. It will be seen that when the lower, conical annular, valve member element 70 seats against the lower, inverted conical valve seat 56 that the outer peripheral corner 84 engages said valve seat 56, and that continued force by the solenoid 83 compresses the lower, conical annular, valve member element 70 downwardly onto the lower, inverted conical, valve seat 56 to form an efficient seal with the said valve seat 56. The last described action of the lower, conical annular, valve member element 70 functioning with said lower valve seat 56 provides a cushioning effect and dampens the blow of the fast moving molded annular poppet valve member 40 and the poppet valve spool 15. When the solenoid 83 is de-energized the return spring 44 functions to move the poppet valve spool 15 upwardly to seat the upper, conical annular, valve member element 60 against the upper, circular sharp edged valve seat 54. The return spring 44 moves the poppet valve spool 15 upwardly in a fast manner but not as fast as the movement of the poppet valve spool 15 when it is moved downwardly by the action of the solenoid 83. The aforedescribed novel upper and lower valve member elements 60 and 70, and the mating valve seats 54 and 56 provide a poppet valve structure which can employ a compound such as a nitrile compound to form the molded annular poppet valve member 50 so that it can function without abrasion and other injurious action when the poppet valve spool 15 is shifted between the inoperative or closed position and the operative or open position.

The poppet valve spool 15 is balanced in the normally closed or inoperative position and in the open or operative position, because the diameter of the sharp edged valve seat 54, the diameter of the lower outer peripheral corner 84 on the lower, conical annular, valve member element 70, and the axial valve spool bore 41, are all equal.

It will be seen that the upper, conical annular, valve member element 60 exerts a combined transverse and longitudinal sealing pressure on the upper, circular sharp edged poppet valve seat 54 when it is seated thereon, when the poppet valve spool 15 is in the normally inoperative or closed position. On the other hand the lower, conical annular, valve member element 70 exerts a longitudinal sealing pressure on the lower, circular angled poppet valve seat 56 when it is seated thereon and the poppet valve 15 is in the open operative position.

What is claimed is:

1. A three-way, normally closed, pilot air valve, including a valve body structure having a pressurized pilot air inlet port, a cylinder port, and an exhaust port, characterized in that:
   (a) said valve body structure has an axial bore formed therethrough;
   (b) a first passageway means is formed through the valve body structure and it connects said pressurized pilot air inlet port to the cylinder port;
   (c) a second passageway means is formed through the valve body structure and it connects said exhaust port to the cylinder port;
   (d) an upper, transverse, circular sharp edged poppet valve seat is formed in the axial bore, in the first passageway means, and a lower, circular inverted conical poppet valve seat is formed in the axial bore, in the second passageway means;
   (e) a poppet valve spool is movably mounted in said axial bore and it is movable between a normally closed inoperative position and an open operative position;
   (f) said poppet valve spool is provided with an upper, conical annular, valve member element and a longitudinally spaced apart lower, conical annular, valve member element, for sealing engagement with the upper, transverse circular sharp edged poppet valve seat and the lower, circular inverted conical poppet valve seat, respectively, so that when the poppet valve spool is in the normally closed inoperative position, the upper, conical annular, valve member element is seated on the upper, transverse circular sharp edged poppet valve seat and exerts a combined transverse and longitudinal sealing pressure thereon, and the poppet valve spool blocks communication through the first passageway means between the inlet port and the cylinder port through said axial bore while simultaneously the lower, conical annular, valve member element is in an unseated position, with communication open between the cylinder port and the exhaust port through said axial bore to allow the air under pressure entering said cylinder port to be exhausted out said exhaust port, and when the poppet valve spool is moved to the open operative position the lower, conical annular, valve member element is seated on the lower, circular inverted conical poppet valve seat and exerts a longitudinal sealing pressure thereon, and the poppet valve spool blocks communication through the second passageway means, to block exhaustion of air from the cylinder port to the exhaust port, and the upper, conical annular, valve member element is unseated to open communication between the pilot air inlet port and the cylinder port through the first passageway means to allow pressurized pilot air to flow from the pilot air inlet port to the cylinder port;
   (g) the poppet valve spool is biased to the normally closed inoperative position by a return spring means engaged with the lower end of the poppet valve spool;
   (h) the poppet valve spool is moved to the open operative position by a solenoid means;
   (i) the upper, conical annular, valve member element has a periphery with a diameter larger than the diameter of the upper, transverse, circular sharp edged poppet valve seat, and the lower, conical annular, valve member element has a periphery with a diameter equal to the transverse, circular sharp edged poppet valve seat;
   (j) the lower, conical annular, valve element has an angled valve seat engaging surface which commences at the lower end of the periphery thereof and angles downwardly and inwardly from a transverse plane, at an acute angle to form a circular corner on the lower, conical annular, valve element, which is the initial, circular contact portion of the lower, conical annular, valve element when it seats on the lower inverted conical valve seat;
   (k) the diameter of the circular sharp edged valve seat, the diameter of the circular corner on the lower, conical annular, valve element, and the diameter of the axial valve spool bore are all equal to provide a balanced poppet valve spool when the poppet valve spool is in the inoperative and operative positions; and,
   (l) the angled surface of the lower, circular inverted conical valve seat is formed downwardly and inwardly, from a transverse plane, to a larger acute angle than the acute angle valve seat engaging surface on the lower, conical annular, valve member element.

2. A three-way, normally closed, pilot air valve as defined in claim 1, characterized in that:
   (a) said valve body structure includes a removable tubular valve retainer member, and said axial bore and upper and lower valve seats are formed in said tubular valve retainer member.

* * * * *